Oct. 12, 1926.　　　　　　　　　　　　　　　　1,603,033
F. R. ERICSON
ELASTIC FLUID TURBINE
Filed Oct. 20, 1924

Inventor,
Franklin R. Ericson,
by
His Attorney.

Patented Oct. 12, 1926.

1,603,033

UNITED STATES PATENT OFFICE.

FRANKLIN R. ERICSON, OF BEVERLY, MASSACHUSETTS, ASSIGNOR TO GENERAL ELECTRIC COMPANY, A CORPORATION OF NEW YORK.

ELASTIC-FLUID TURBINE.

Application filed October 20, 1924. Serial No. 744,575.

The present invention relates to elastic fluid turbines, and especially turbines from which elastic fluid is extracted from a stage for industrial purposes.

When elastic fluid is extracted from one of the higher pressure stages of a turbine, there is danger under certain circumstances that the pressure in the extraction stage may reach a dangerously high value and for this reason it is desirable to provide, in connection with the extraction conduit, a pressure relief valve which will open to relieve the pressure in case it exceeds a predetermined high value.

For this service it is desirable to employ a relief valve of the full open type, that is, one which when operated opens to substantially full pipe area. However, because of the high pressure to be dealt with, an ordinary relief valve is not satisfactory, and the object of my present invention is to provide an improved relief valve which will operate in a successful manner with high pressures.

For a consideration of what I believe to be novel and the invention, attention is directed to the accompanying description and the claims appended thereto.

Figure 1:
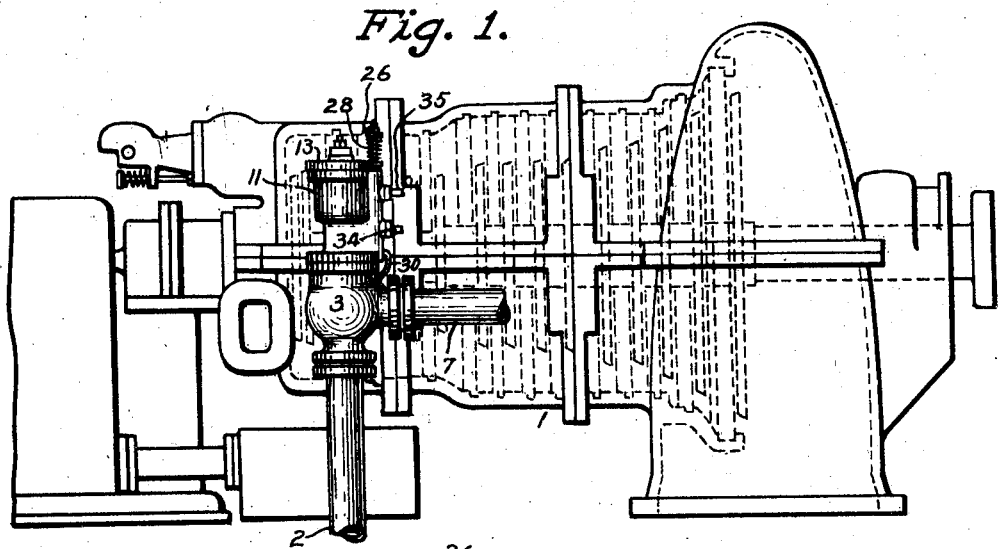
Figure 2:
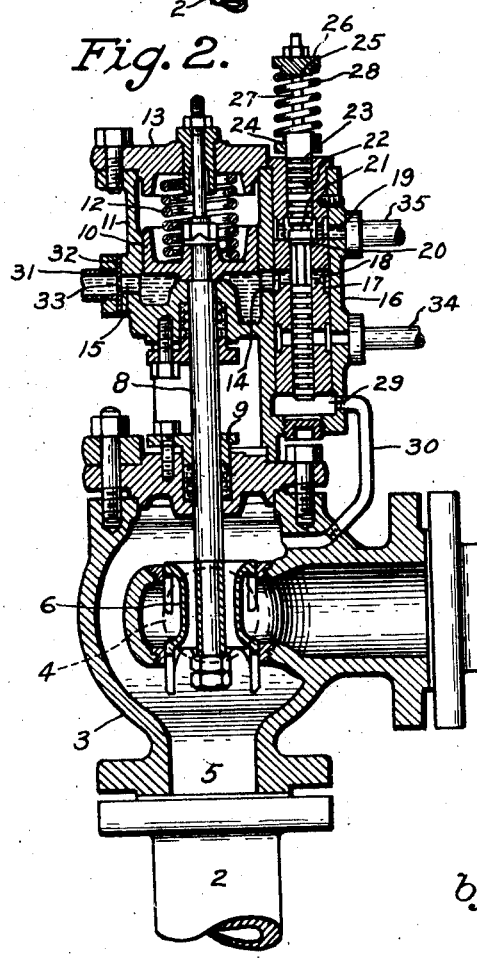
Figure 3:
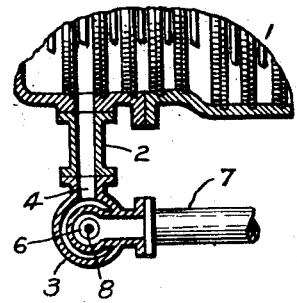

In the drawing, Fig. 1 is a side elevation of an extraction turbine having an extraction conduit provided with a relief valve embodying my invention; Fig. 2 is a sectional view of the relief valve; and Fig. 3 is a detail plan view thereof.

Referring to the drawing, 1 indicates an elastic fluid turbine which may be of any suitable type and which is provided with an extraction conduit 2 connected with one of the higher pressure stages. In conduit 2 is a pressure relief valve 3 embodying my invention, elastic fluid from the extraction stage of the turbine entering the valve casing through an opening 4 and flowing from it through an opening 5. In the valve casing is a valve member 6 of the balanced type which when in closed position (as shown in the drawing) prevents flow of elastic fluid through a relief conduit 7 which conduit may lead to any suitable region of lower pressure. When valve member 6 is raised, thereby opening valve 3, elastic fluid may flow from the extraction conduit 2 through the relief conduit 7, thereby relieving the pressure in conduit 2 and hence that to which the turbine diaphragm is subjected.

Connected to valve member 6 is a stem 8 which extends out through a stuffing box 9 and is connected at its outer end to a piston 10 located in a cylinder 11. Valve member 6 is biased to closed position by a spring 12 which at one end engages the upper surface of piston 10 and at the other end engages the under side of the cover plate or head 13 of cylinder 11. In cylinder 11 beneath the piston 10 is an inlet port 14 and a discharge port 15.

Attached to cylinder 11 is a pilot valve casing 16 in which is a bushing 17 provided with a discharge port 18 which communicates with inlet port 14. In the pilot valve casing 16 is an inlet port 19 and in bushing 17 between ports 19 and 18 is a valve seat 20 upon which a pilot valve 21 rests. When seated valve member 21 cuts off communication between ports 19 and 18. Valve member 21 is carried by a stem 22 provided with suitable packing means in the form of rings 23 formed by grooves cut in the stem. The outer end of stem 22 is connected to a spring seat 24. In spaced relation to spring seat 24 is a stationary spring seat 25 carried by a cross-piece 26 which is supported by studs 27, which at their lower ends are attached to the pilot valve casing. Arranged between spring seats 24 and 25 is a spring 28 which serves to bias valve member 21 to closed position.

The lower end of pilot valve stem 22 terminates in a chamber 29 formed at the bottom of casing 16, and this chamber is connected by a pipe 30 to the extraction conduit 2 whereby the lower end of pilot valve stem 22 is subjected to the extraction pressure.

Connected to discharge port 15 is a discharge pipe 31 in which is a diaphragm 32 provided with a small orifice 33. Discharge pipe 31 may lead to any suitable region of lower pressure. Also connected to pilot valve casing 16 is a discharge pipe 34 for conveying away fluid leaking along the pilot valve stem. Connected to inlet port 19 is a pipe 35 which leads from any suitable source of fluid pressure, such as for example, the force feed lubricating system for the turbine.

In operation, spring 28 is set to normally hold valve member 21 seated against the pressure of the elastic fluid in extraction conduit 2, and to maintain it seated as long as such pressure does not exceed a predetermined high value. Under these conditions the fluid pressure under piston 10 is of a nominal value and spring 12 holds valve member 6 in closed position. If now the pressure in extraction conduit 2 exceeds the predetermined value, then such pressure, acting on the bottom of pilot valve stem 22 lifts pilot valve member 21 off its seat, thereby admitting fluid pressure from pipe 35 through ports 19, 18 and 14 to the under side of piston 10. This builds up a fluid pressure under piston 10 causing it to move upward and open pressure relief valve member 6 to relieve the pressure in conduit 2. As soon as the pressure is relieved, the pilot valve member 21 will be again forced back to its seat thereby cutting off the supply of fluid pressure to cylinder 11 and permitting valve member 6 to be closed by spring 12.

The orifice 33 in the discharge pipe 31 determines the time of operation and the sensitiveness of the mechanism. The orifice is made of such area that a desired travel of the pilot valve member 21 will take place before valve member 6 is moved to open position and that a desired interval of time will be required for the pressure under piston 10 to be relieved and valve member 6 closed.

Also when pilot valve member 21 is moved to open position it is then subjected to the pressure of the operating fluid flowing to cylinder 11, and this pressure tends to hold it open to some extent. As a result, the pressure in the extraction conduit 2 must fall a certain amount below that at which it was opened in order that the spring 28 may close it. This is a desirable feature of the construction in that it provides for definite opening and closing pressures and thus prevents hunting or chattering of the mechanism.

As will be clear, when the valve mechanism is operated, valve member 6 will be moved to full open position to quickly relieve the pressure in the extraction conduit and will not assume intermediate or partially open positions. Also, it will be noted that when valve member 6 is in closed position pilot valve member 21 is also seated so that there is no fluid pressure under piston 10 which means that leakage is reduced to a minimum.

In accordance with the provisions of the Patent Statutes, I have described the principle of operation of my invention, together with the apparatus which I now consider to represent the best embodiment thereof, but I desire to have it understood that the apparatus shown is only illustrative and that the invention may be carried out by other means.

What I claim as new and desire to secure by Letters Patent of the United States, is:—

1. The combination with an elastic fluid turbine and an extraction conduit connected thereto, of a branch conduit connected to said extraction conduit for conveying elastic fluid to a region of lower pressure, and a pressure relief mechanism controlling the flow of elastic fluid through said branch conduit, said mechanism comprising a valve having a stem, a piston connected to the stem, a cylinder in which the piston moves, means biasing the piston to a position wherein the valve is closed, a pilot valve controlling the admission of actuating fluid to said cylinder, means biasing said pilot valve to closed position, and means whereby said pilot valve is subjected to the pressure in the extraction conduit to effect opening of the pilot valve against the action of its biasing means when the pressure in the extraction conduit exceeds a predetermined value.

2. The combination with an elastic fluid turbine and an extraction conduit connected thereto, of a branch conduit connected to said extraction conduit for conveying elastic fluid to a region of lower pressure, and a pressure relief mechanism controlling the flow of elastic fluid through said branch conduit, said mechanism comprising a valve having a stem, a piston connected to the stem, a cylinder in which the piston moves, means biasing the piston to a position wherein the valve is closed, a pilot valve casing, a pilot valve in the casing controlling the admission of actuating fluid to said cylinder, a stem for the pilot valve, means whereby the lower end of said stem is subjected to the pressure in the extraction conduit, and a spring which normally holds the pilot valve closed against the action of such pressure.

3. The combination with an elastic fluid turbine and an extraction conduit connected thereto, of a branch conduit connected to said extraction conduit for conveying elastic fluid to a region of lower pressure, and a pressure relief mechanism controlling the flow of elastic fluid through said branch conduit, said mechanism comprising a valve having a stem, a piston connected to the stem, a cylinder in which the piston moves, means biasing the piston to a position wherein the valve is closed, a pilot valve casing, a pilot valve in the casing controlling the admission of actuating fluid to said cylinder, a stem for the pilot valve, means whereby the lower end of said stem is subjected to the pressure in the extraction conduit, a spring which normally holds the pilot valve closed against the action of such pressure, and means forming a passage of restricted area for the discharge of actuating fluid from said cylinder.

In witness whereof, I have hereunto set my hand this 17th day of October 1924.

FRANKLIN R. ERICSON.